(12) United States Patent
Zhang

(10) Patent No.: US 7,940,647 B2
(45) Date of Patent: May 10, 2011

(54) METHOD AND NODE FOR IMPLEMENTING MULTICAST FAST REROUTE

(75) Inventor: Haiyan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 12/413,144

(22) Filed: Mar. 27, 2009

(65) Prior Publication Data

US 2009/0185478 A1     Jul. 23, 2009

Related U.S. Application Data

(63) Continuation of application No. PCT/CN2007/070417, filed on Aug. 6, 2007.

(30) Foreign Application Priority Data

Sep. 27, 2006    (CN) .......................... 2006 1 0127898

(51) Int. Cl.
    *H04L 12/26*       (2006.01)
    *H04L 12/28*       (2006.01)
    *G06F 11/00*       (2006.01)
    *G06F 15/177*      (2006.01)
(52) U.S. Cl. ........ 370/217; 370/225; 370/254; 370/390; 370/408; 370/432; 709/221; 709/239; 709/252; 714/4
(58) Field of Classification Search .................. 370/217, 370/221, 390, 432, 225, 254, 408; 709/221, 709/239, 252; 714/4
See application file for complete search history.

(56) References Cited

U.S. PATENT DOCUMENTS

| | | | | |
|---|---|---|---|---|
| 6,904,018 | B2 * | 6/2005 | Lee et al. ....................... | 370/238 |
| 7,512,063 | B2 * | 3/2009 | Vasseur et al. ................ | 370/217 |
| 7,539,131 | B2 * | 5/2009 | Shen ............................. | 370/217 |
| 7,586,841 | B2 * | 9/2009 | Vasseur ........................ | 370/218 |
| 7,626,925 | B1 * | 12/2009 | Sivabalan et al. ............. | 370/228 |
| 7,643,499 | B2 * | 1/2010 | Rajsic ........................... | 370/401 |
| 7,680,952 | B1 * | 3/2010 | Pan et al. ...................... | 709/239 |
| 7,693,046 | B2 * | 4/2010 | Rajagopalan et al. ........ | 370/216 |
| 7,702,810 | B1 * | 4/2010 | Pan et al. ...................... | 709/242 |

(Continued)

FOREIGN PATENT DOCUMENTS

CN         1805412 A     7/2006

(Continued)

OTHER PUBLICATIONS

Li et al., "Efficient Distributed MPLS P2MP Fast Reroute," *IEEE International Conference on Computer Communications*, 1-11 (Apr. 2006).

(Continued)

*Primary Examiner* — Alpus H Hsu
(74) *Attorney, Agent, or Firm* — Leydig, Voit & Mayer, Ltd.

(57) ABSTRACT

A method for implementing multicast fast reroute includes: determining a route for a backup LSP according to the tree topology of a point-to-multipoint primary LSP and establishing the backup LSP according to the determined route for the backup LSP. In the process of establishing the backup LSP, messages for the primary LSP and its corresponding backup LSPs are further merged to decrease the number of network signaling states. A node includes a transceiver unit and a backup LSP path establishing unit. The present invention can save protection bandwidth, optimize network resource utilization, and enhance utilization efficiency of resources.

10 Claims, 4 Drawing Sheets

U.S. PATENT DOCUMENTS

| | | | |
|---|---|---|---|
| 7,792,111 B2* | 9/2010 | Narayanan et al. | 370/390 |
| 7,835,267 B2* | 11/2010 | Zamfir et al. | 370/216 |
| 7,889,641 B2* | 2/2011 | Liu et al. | 370/228 |
| 7,899,049 B2* | 3/2011 | Raj et al. | 370/390 |
| 2003/0002444 A1 | 1/2003 | Shin et al. | |
| 2006/0126496 A1 | 6/2006 | Filsfils et al. | |
| 2006/0159009 A1 | 7/2006 | Kim et al. | |
| 2007/0183317 A1* | 8/2007 | Vasseur et al. | 370/225 |

FOREIGN PATENT DOCUMENTS

| | | |
|---|---|---|
| EP | 1 271 844 A2 | 1/2003 |
| KR | 2005-0047667 A | 5/2005 |

OTHER PUBLICATIONS

State Intellectual Property Office of the People's Republic of China, English Translation of Written Opinion of the International Searching Authority in International Patent Application No. PCT/CN2007/070417 (Nov. 15, 2007).

European Patent Office, Examination Report in European Patent Application No. 07785412.3 (Jul. 29, 2010).

State Intellectual Property Office of the People's Republic of China, Examination Report in Chinese Patent Application No. 200610127898.4 (May 8, 2009).

\* cited by examiner

METHOD AND NODE FOR IMPLEMENTING MULTICAST FAST REROUTE

CROSS REFERENCE TO RELATED APPLICATIONS

This application is a continuation of International Patent Application No. PCT/CN2007/070417, filed Aug. 6, 2007, which claims priority to Chinese Patent Application No. 200610127898.4, filed Sep. 27, 2006, both of which are hereby incorporated by reference in their entirety.

FIELD OF THE INVENTION

The present invention relates to a technology for local protection of Multiple Protocol Label Switch (MPLS) network, and particularly to a method and a node for implementing multicast Fast Reroute (FRR).

BACKGROUND

FRR is a technology proposed by Internet Engineering Task Force (IETF) for local protection of a MPLS network. The technology provides fast protection switching capability for a Label Switched Path (LSP) by means of traffic engineering capability of the MPLS.

MPLS fast reroute is characterized by quick response, timely switching, assurance for smooth transition of service data, and decrease of service interruption. Local backup paths are established in advance, and then when any failure occurs, a device may quickly switch service to a backup path upon detecting the failure of a link or a node, thereby protecting a LSP from the failure of the link or the node and decreasing data loss. At the same time, the LSP's source node may attempt to find a new path for re-establishing a new LSP and switching data to the new path. Service data will be forwarded over a detour until a new LSP is established successfully.

There are mainly two existing modes for implementing point-to-point (P2P), i.e., unicast LSP fast reroute: 1:1 (one-for-one) protection mode and tunnel protection mode. In the one-for-one protection mode, a detour is established for each potential Point of Local Repair (PLR) in a protected LSP. In the tunnel protection mode, a bypass tunnel is established to protect multiple LSPs passing same nodes and links.

In the one-for-one protection mode, a primary LSP is established through a Resource Reservation Protocol-Traffic Engineering (RSVP-TE) signaling. The signaling for the establishment contains the LSP's protection characteristics including whether local protection is required, whether node protection is required, whether bandwidth protection is required, and properties of a backup LSP. Each node on the primary LSP except for destination nodes is a PLR. The PLR computes and establishes a backup LSP from the present PLR to the destination nodes of the primary LSP according to protection characteristics of the primary LSP and local policy, in order to protect its downstream link and node.

FIG. 1 is a schematic diagram for implementing unicast one-for-one fast reroute. As shown in FIG. 1, there are one primary LSP and two backup LSPs. The primary LSP is [R1, R2, R3, R4, R5, R6], the backup LSP1 is [R2, R7, R8, R9, R4, R5, R6], and the backup LSP2 is [R3, R8, R9, R5, R6]. When the link [R2->R3] fails, R2 may switch traffic from the primary LSP to the backup LSP1, and the traffic transmission path is changed to [R1, R2, R7, R8, R9, R4, R5, R6]. In this way, services are not interrupted due to failure of link [R2->R3].

FIG. 2 is a schematic diagram for implementing point-to-multipoint (P2MP), i.e. multicast one-for-one fast reroute. The basic concept lies in dividing a point-to-multipoint LSP into multiple point-to-point sub-LSPs. As shown in FIG. 2, there are four sub-LSPs: [S, A, B, d1], [S, A, B, E, d2], [S, A, C, D, d3], and [S, A, C, D, d4]. Backup LSPs are established for the sub-LSPs respectively according to existing point-to-point fast reroute mechanism, in order to protect the sub-LSPs.

The existing solution for implementing multicast fast reroute need establish backup LSPs for all sub-LSPs respectively in order to protect the sub-LSPs. Since links or nodes existing in respective sub-LSPs may overlap each other, it is likely to establish many redundant detours if backup LSPs are established for all the sub-LSPs respectively, hence consuming much protection bandwidth and wasting network resources.

SUMMARY

Accordingly, the object of the present invention is to provide a method and a node for implementing multicast fast reroute in order to save protection bandwidth.

To achieve the above-mentioned object, embodiments of the present invention provide a method for implementing multicast fast reroute, and the method includes: determining a route for a backup LSP according to a tree topology of a point-to-multipoint primary LSP and establishing the backup LSP according to the determined route for the backup LSP.

The determining the route for the backup LSP according to the tree topology of the point-to-multipoint primary LSP includes the following process: a PLR determines information of a protection object to be protected according to routing information carried in a primary LSP establishing message, and determines the route for the backup LSP according to the routing information and protection property requirements of the primary LSP on the backup LSP.

The source node of the route for the backup LSP is the PLR, destination nodes of the route for the backup LSP are a set of destination nodes which are downstream nodes of the PLR in the primary LSP, and the route for the backup LSP bypasses the protection object to be protected.

The process for the PLR to establish the backup LSP includes: the PLR sends a path establishing request carrying the route for the backup LSP to the destination nodes; each of the destination nodes, after receiving the path establishing request for the backup LSP, returns a path establishing reply to the PLR and reserves resources.

The process for establishing the backup LSP further includes: merging the path establishing request messages for the primary LSP and its corresponding backup LSPs.

The merging further includes the following process: a node, which receives the path establishing request messages for the primary LSP and the backup LSPs having the same set of destination nodes, merges the path establishing request messages for the primary LSP and the backup LSPs, and saves the path establishing request message for the primary LSP after the merging.

The merging further includes: a node, which receives path establishing request messages for more than one backup LSPs having the same set of destination nodes, and sharing the same next-hop nodes and outgoing interface, merges the path establishing request messages for the more than one backup LSPs, and selects a path establishing request message to be saved after the merging according to a certain policy.

The policy includes: a path establishing request message for a backup LSP that traverses the nodes protected by any of the other backup LSPs is not saved.

The policy includes: a path establishing request message for a backup LSP closest to the primary LSP is saved.

The backup LSP closest to the primary LSP may be the one having the shortest weight of distance from a detour merge point to the primary LSP.

The policy includes: a path establishing request message is saved according to a local policy of the detour merge point.

The process for establishing the backup LSP further includes: the PLR reports protection status and backup LSP status to the source node of the primary LSP.

Embodiments of the present invention also provide a node, which includes a transceiver unit adapted to transmit and receive a message and a backup LSP path establishing unit. The backup LSP path establishing unit is adapted to determine a route for a backup LSP according to the tree topology of a point-to-multipoint primary LSP, and establish the backup LSP according to the determined backup LSP route.

The backup LSP path establishing unit is further adapted to receive path establishing request messages for the primary LSP and its corresponding backup LSPs transmitted from the transceiver unit, merge the received path establishing request messages, and transmit the merged path establishing request message through the transceiver unit.

In embodiments of the present invention, a route of a backup LSP is determined according to the tree topology of a point-to-multipoint primary LSP, and the backup LSP is established according to the determined backup LSP route, so that it is not necessary to establish a backup LSP for each sub-LSP. In addition, the message merging mechanism facilitates decreasing the number of network signaling states, so as to save protection bandwidth, optimize network resource utilization, and improve utilization efficiency of resources.

DETAILED DESCRIPTION

In order to make the objects, technical solutions and advantages of the present invention clearer, further detailed description of the present invention will be given by means of embodiments with reference to accompanying drawings.

The basic idea of the method for implementing multicast fast reroute according to embodiments of the present invention lies in: determining a route for a backup LSP according to the tree topology of a point-to-multipoint primary LSP, and establishing the backup LSP according to the determined route for the backup LSP.

Figure 3:
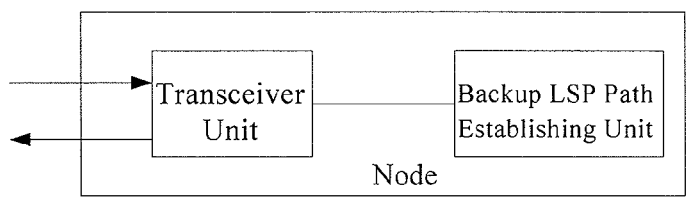
FIG. 3 is a block diagram illustrating a node according to an embodiment of the present invention.

The present invention further provides a node corresponding to the method provided in the present invention. As shown in FIG. 3, the node includes: a transceiver unit, adapted to transmit and receive messages; and a backup LSP path establishing unit, adapted to determine a route for a backup LSP according to the tree topology of a point-to-multipoint primary LSP, and establish the backup LSP according to the determined route for the backup LSP.

The backup LSP path establishing unit may further be adapted to receive a path establishing request message for the primary LSP and a path establishing request message for the backup LSP corresponding to the primary LSP from the transceiver unit, merge the received path establishing request messages, and transmit the merged path establishing request message through the transceiver unit.

Figure 1:
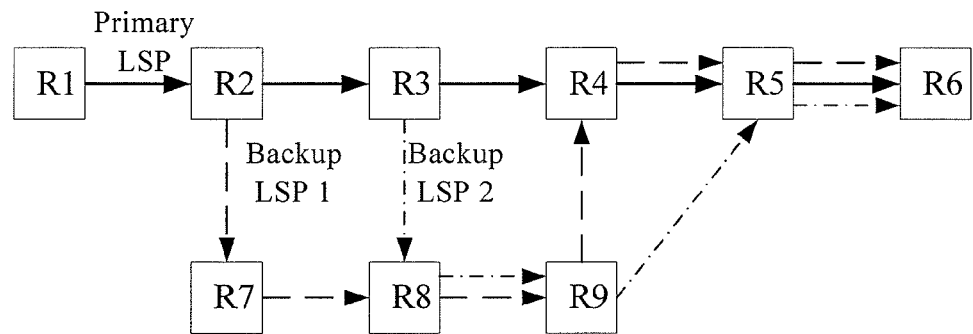
FIG. 1 is a schematic diagram for implementing unicast one-for-one fast reroute.
Figure 2:
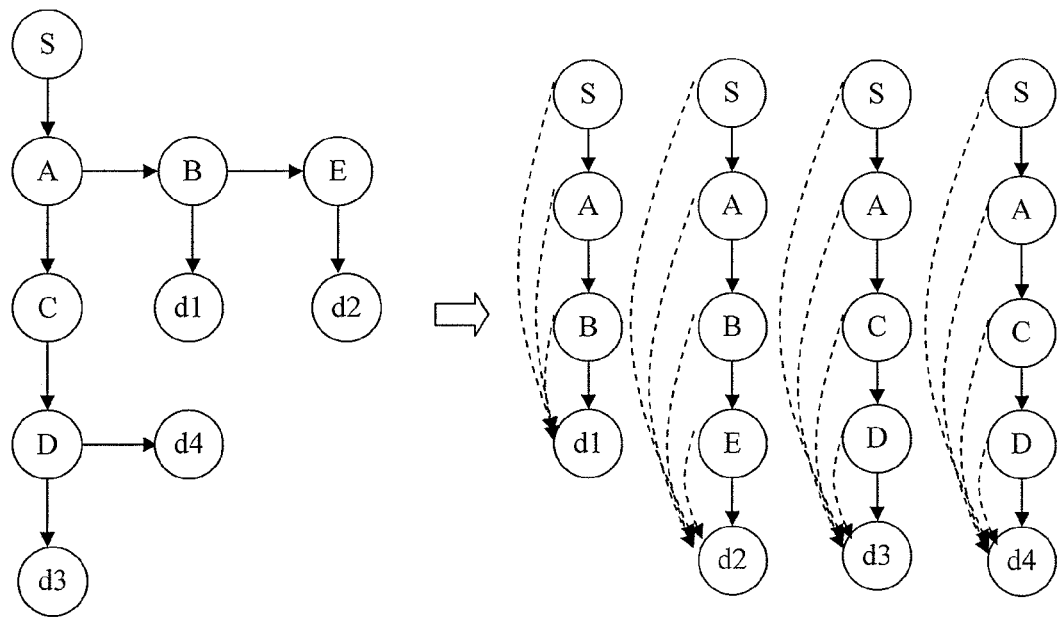
FIG. 2 is a schematic diagram for implementing multicast one-for-one fast reroute.
Figure 4:
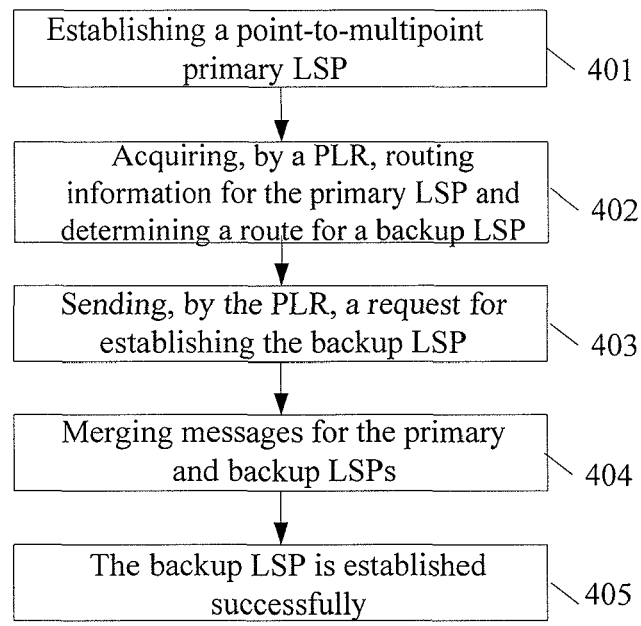
FIG. 4 is a flowchart illustrating a method for implementing multicast fast reroute according to an embodiment of the present invention.

The present invention will be described in detail taking the point-to-multipoint LSP tree topology shown in FIG. 2 as an example. Specifically, as shown in FIG. 4, a method for implementing multicast fast reroute according to an embodiment mainly includes the following steps.

Step 401: A point-to-multipoint primary LSP is established.

Figure 5:
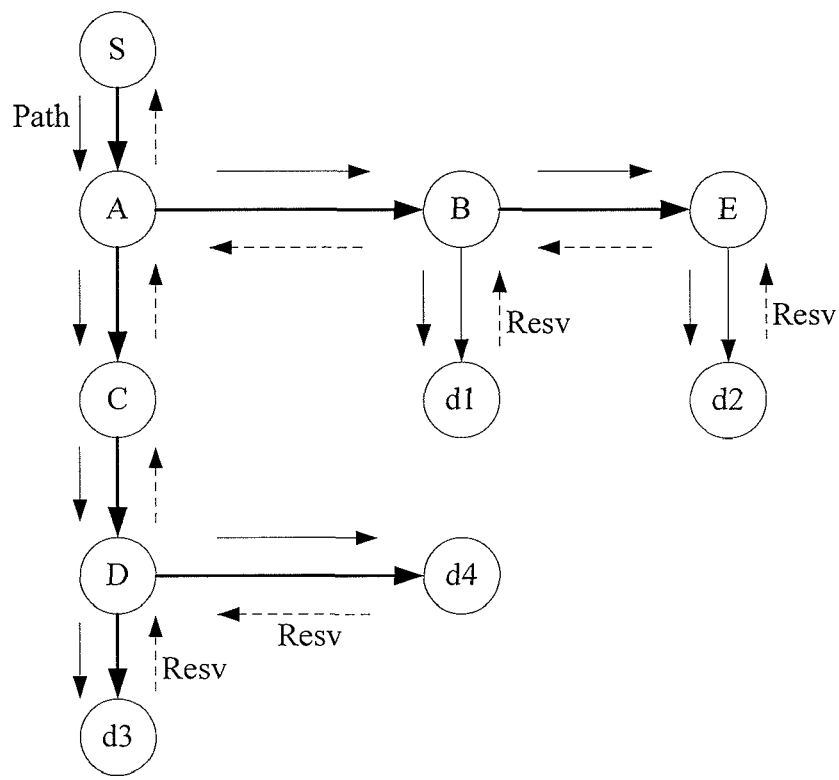
FIG. 5 is a schematic diagram illustrating a process for establishing a primary LSP according to an embodiment of the present invention.

As shown in FIG. 5, in a process of establishing a point-to-multipoint primary LSP, a source node S sends a path establishing request (e.g. Path Message, which is taken as an example for description hereinafter) which carries protection characteristics of the primary LSP, the protection characteristics includes whether local protection is required, whether node protection is required, whether bandwidth protection is required, properties of backup LSPs, and so on, where the entire point-to-multipoint LSP has the same protection characteristics. After destination nodes d1, d2, d3, d4 receives the Path Message for the primary LSP from the source node S, each of the destination nodes d1, d2, d3, d4 sends back a path establishing reply (e.g., Resv Message, which is taken as an example for description hereinafter) and performs resource reservation. After the source node S receives the Resv Message, the protected LSP is successfully established.

After each of PLRs, which are nodes in the primary LSP except for the destination nodes, receives a Resv Message for the primary LSP, the PLR determines whether a one-for-one protection backup LSP is required to be established and property requirements such as whether the object to be protected by the backup LSP is a node and/or a link according to protection characteristics of the primary LSP and local policy.

Step 402: After the PLR determines that a one-for-one protection backup LSP is to be established, the PLR acquires a list of downstream nodes in the primary LSP from the routing information carried in the establishing message (e.g., Path Message and/or Resv Message) for the primary LSP, determines information of a protection object such as a downstream node and/or a link to be protected, and determines an explicit route for the backup LSP according to the routing information and the primary LSP's protection property requirements on the backup LSP.

The backup LSP is a point-to-multipoint LSP with one or more destination nodes. The explicit route of the backup LSP is characterized in that:

1) The route bypasses the protection object to be protected (links and/or nodes).

2) The source node of the route is the PLR, and the destination nodes of the route are a set of downstream destination nodes (i.e. downstream nodes of the protected node and/or link) of the PLR in the primary LSP.

Figure 6:
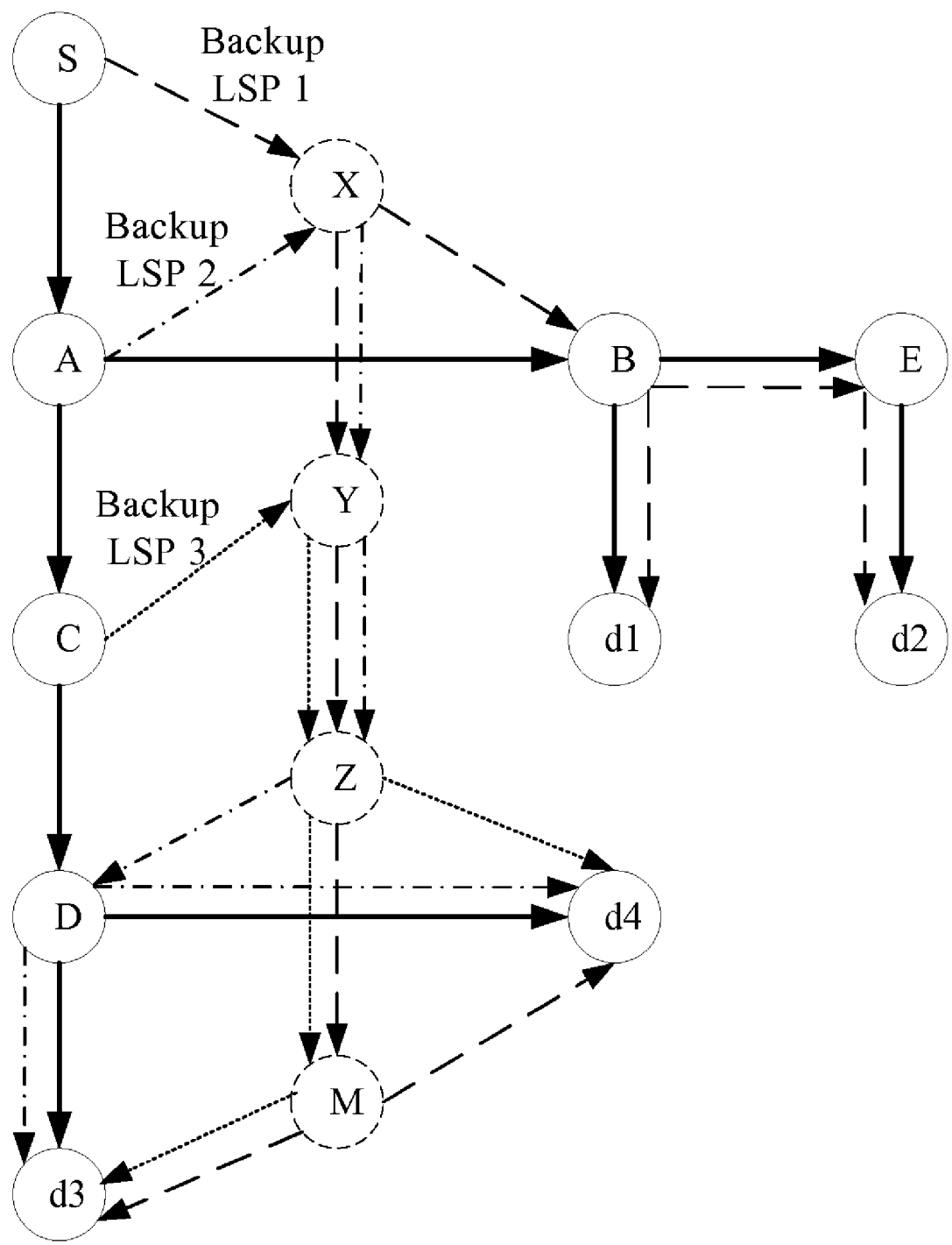
FIG. 6 is a schematic diagram illustrating explicit routes for backup LSPs according to an embodiment of the present invention.

FIG. 6 illustrates explicit routes for three backup LSPs.

The node S, as a PLR, establishes a backup LSP, which is shown as backup LSP 1 with broken line in FIG. 6, to protect its downstream node A and link S-A. The backup LSP 1 bypasses the node A and the link S-A, and the destination nodes in the backup LSP 1 are a set of destination nodes (d1, d2, d3, d4) of the downstream node A.

The node A, as a PLR, establishes a backup LSP, which is shown as backup LSP 2 with dot dash line in FIG. 6, to protect its downstream node C and link A-C. The backup LSP 2 bypasses the node C and the link A-C, and the destination nodes in the backup LSP 2 are a set of destination nodes (d3, d4) of the downstream node C.

The node C, as a PLR, establishes a backup LSP, which is shown as backup LSP 3 with dot line in FIG. 6, to protect its downstream node D and link C-D. The backup LSP 3 bypasses the node D and the link C-D, and the destination nodes in the backup LSP 3 are a set of destination nodes (d3, d4) of the downstream node D.

Step 403: After an explicit route for a backup LSP is determined, a PLR sends to destination nodes a path establishing request (e.g. Path Message, which is taken as an example for description hereinafter) carrying the explicit route for backup LSP, to establish the backup LSP.

The process of establishing a backup LSP is specifically performed by a backup LSP path establishing unit. The backup LSP path establishing unit determines a route for a backup LSP according to the tree topology of a point-to-multipoint primary LSP. Specifically, the backup LSP path establishing unit determines information of a protection object to be protected according to routing information carried in a primary LSP establishing message sent from the transceiver unit, and determines the route for the backup LSP according to the routing information and the primary LSP's protection property requirements on the backup LSP.

Step 404: A node, which receives Path Messages for the primary LSP and the multiple backup LSPs corresponding to the primary LSP, may merge the Path Messages for the primary and backup LSPs or merge the Path Messages for the backup LSPs, so as to reduce the number of network signaling states, optimize network resource utilization and improve utilization efficiency of resources.

A node which merges messages for primary and backup LSPs is referred to as a Merge Point (MP), and a node which merges messages for backup LSPs is referred to as a Detour Merge Point (DMP).

A signaling message contains a Session Object (including P2MP ID, Tunnel ID, and Extended Tunnel ID) and a Sender Template Object (including Tunnel Sender Address, LSP ID, Sub-Group Originator ID, and Sub-Group ID). A point-to-multipoint LSP may be uniquely identified with (P2MP ID+Tunnel ID+Extended Tunnel ID+Tunnel Sender Address+LSP ID). The primary LSP and its corresponding backup LSPs have the same LSP identification, i.e. the same (P2MP ID+Tunnel ID+Extended Tunnel ID+Tunnel Sender Address+LSP ID). A signaling message for a backup LSP carries a Detour Object. A node may distinguish the primary LSP from its corresponding backup LSPs by determining whether a Detour Object is carried in the signaling message. For Sub-Group Originator ID and Sub-Group ID in the Sender Template Object, there is no correspondence between the primary and backup LSPs.

The principle for merging messages is provided as follows.

1) Message merging may be performed for a primary LSP and a backup LSP having the same set of destination nodes, and the Path Message for the primary LSP is saved after the merging.

2) Message merging may be performed among multiple backup LSPs having the same set of destination nodes, and sharing the same next-hop nodes and outgoing interface, and the Path Message to be saved after the merging may be selected according to a certain policy.

The policy for selecting the Path Message to be saved after the merging may be specifically as below.

A. If a backup LSP traverses a node protected by any of the other backup LSPs, the Path Message for this backup LSP should not be saved.

B. If there still remain Path Messages for multiple backup LSP after the above step A, a Path Message for a backup LSP closest to the primary LSP is saved. For example, weights of distance from the DMP to the primary LSP along the respective backup LSPs are calculated according to a certain algorithm, and the backup LSP having the smallest weight is the one closest to the primary LSP.

C. If there still save Path Messages for multiple backup LSPs after the above step B, one Path Message is saved according to the local policy of the DMP to forward downstream.

For example, as shown in FIG. 6, the node B receives Path Messages for a primary LSP and a backup LSP 1 which have the same set of destination nodes (d1, d2). According to the message merging principle 1), the Path Message for the primary LSP is saved, the Path Message for the backup LSP 1 is not saved, and thus node B becomes an MP.

A node X receives Path Messages for the backup LSP 1 and a backup LSP 2 which have different sets of destination nodes (d1, d2, d3, d4) and (d3, d4) respectively. Neither the message merging principle 1) nor the message merging principle 2) is satisfied, and thus message merging is not performed.

A node Y receives Path Messages from the backup LSP 1, the backup LSP 2 and the backup LSP 3 which have the same set of destination nodes (d3, d4), and share the same next hop node and outgoing interface, and thus the message merging principle 2) is satisfied and message merging is allowed. Then, a Path Message to be saved after merging is selected according to the policies A, B and C. The backup LSP 2 passes a node D that is protected by the backup LSP 3, therefore the Path Message for the backup LSP 2 is not saved according to policy A. If the weight of each hop from the node Y to the intersection between a backup LSP and the primary LSP is assumed to be 1, the weight of the distance between the backup LSP 1 and the primary LSP is 4, and the weight of the distance between the backup LSP 3 and the primary LSP is also 4, therefore the backup LSPs 1 and 3 have the same weight and a selection cannot be made between both according to the policy B. Finally, the node Y selects to save a Path Message for one of the backup LSPs according to the local policy, for example, the node Y selects to save the Path Message for the backup LSP 1 by comparing the PLR addresses for the two backup LSPs, and then the node Y becomes a DMP.

Figure 7:
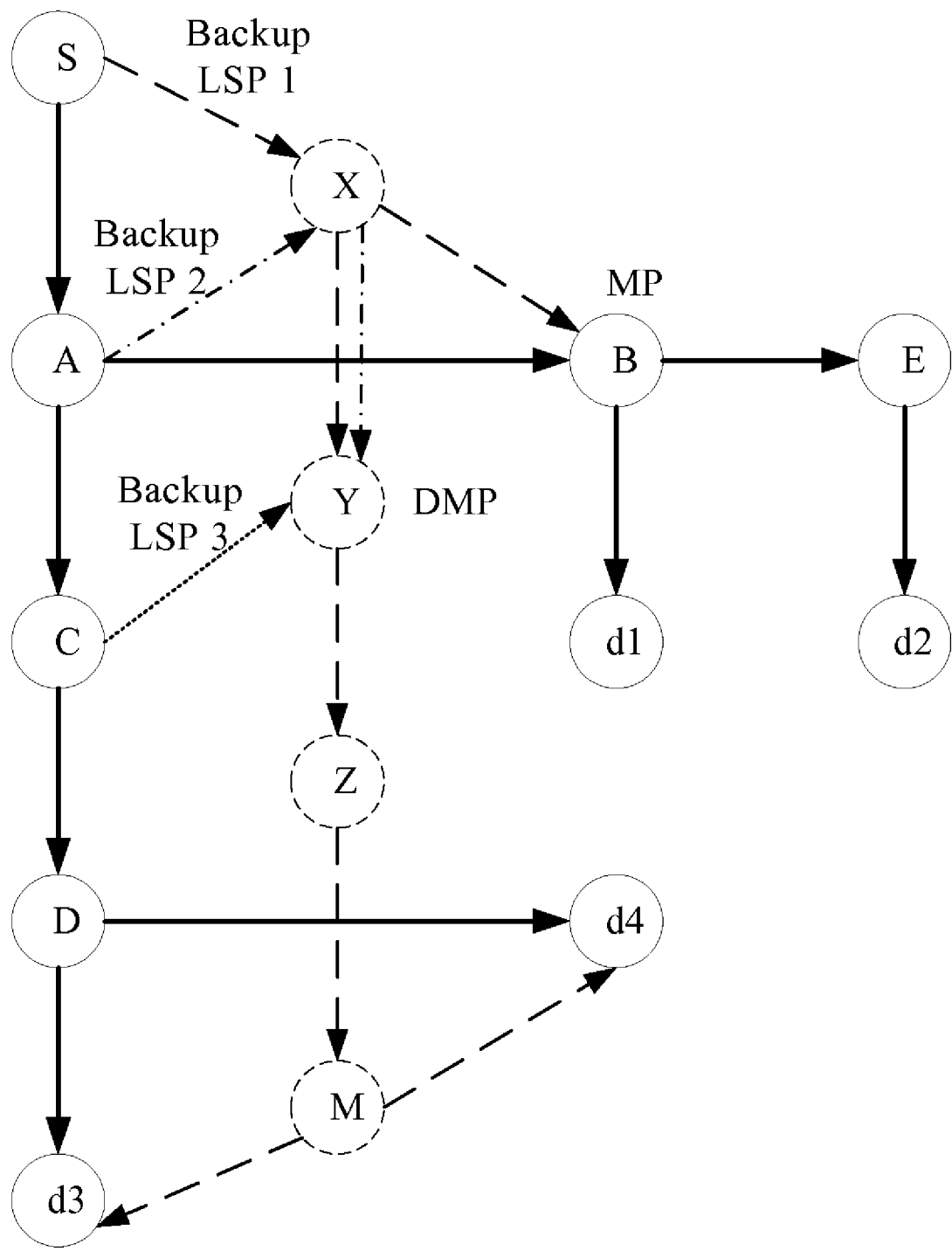
FIG. 7 is a schematic diagram illustrating a path after message merging according to an embodiment of the present invention.

FIG. 7 shows the path status after the Path Message merging according to the above-mentioned principles.

Step 405: After the destination nodes receive Path Messages for backup LSPs, each of the destination nodes sends back a path establishing reply (e.g., Resv Message, which is taken as an example for description hereinafter). After the MP or DMP receives the Resv Message for the primary LSP and/or the backup LSPs, the MP or DMP forwards the Resv Message upstream along the multiple primary and/or backup LSPs which are merged by the MP or DMP. After the PLRs receive the Resv Message for the backup LSPs, the backup LSPs are established successfully.

As shown in FIG. 7, if the link A-C fails, then once the node A detects the failure, the node A may switch traffic, which originally should be forwarded by node A to link A-C, to the corresponding backup LSP 2, and the subsequent route for this traffic becomes [A, X, Y, Z, M, d3 & d4].

During the process of establishing backup LSPs or after successful establishment of backup LSPs, each of the PLRs may report updated protection status and backup LSP status, including whether local protection is available, whether local protection has been enabled, whether bandwidth protection is provided and whether node protection is provided, to the source node of the primary LSP through the status indicating bit carried by RRO Sub-Object in the Resv Message for the primary LSP.

The objects, technical solution and beneficial effects of the present invention have been described in detail. It is to be understood that the above description does not intend to limit the present invention. Any modifications, equivalent substitutions and improvements that fall within the spirit and principle of the present invention should fall within the protection scope of the present invention.

What is claimed is:

1. A method for implementing multicast fast reroute, comprising:
   determining, by a Point of Local Repair (PLR) on a primary Label Switched Path (LSP), a route for a backup LSP according to routing information of the primary LSP and information of a protection object to be protected by the backup LSP; and
   establishing the backup LSP according to the determined route for the backup LSP, wherein the determining the route for the backup LSP further comprises:
   determining, by the PLR, a set of destination nodes of downstream nodes of the PLR in the primary LSP according to the routing information of the primary LSP, determining the protection object to be protected by the backup LSP according to the information of the protection object, and determining the route for the backup LSP according to the set of destination nodes and the protection object, wherein the source node of the route for the backup LSP is the PLR and destination nodes of the route for the backup LSP are the set of destination nodes, and the route for the backup LSP bypasses the protection object.

2. The method of claim 1, wherein the establishing the backup LSP according to the determined route for the backup LSP further comprises:
   sending, from the PLR to the destination nodes of the route for the backup LSP, a path establishing request message carrying the route for the backup LSP; and
   after the destination nodes receive the path establishing request message for the backup LSP, returning from the destination nodes to the PLR a path establishing reply message, reserving resources, and establishing the backup LSP.

3. The method of claim 2, wherein the establishing the backup LSP further comprises:
   merging a path establishing request message for the primary LSP and path establishing request messages for backup LSPs.

4. The method of claim 3, wherein the merging the path establishing request message for the primary LSP and the path establishing request messages for the backup LSPs further comprises:
   merging, by a node which receives the path establishing request messages for the primary LSP and the backup LSPs having same set of destination nodes, the path establishing request messages for the primary LSP and the backup LSPs, and saving the path establishing request message for the primary LSP after the merging.

5. The method of claim 3, wherein the merging the path establishing request message for the primary LSP and the path establishing request messages for the backup LSPs further comprises:
   merging, by a node which receives path establishing request messages for more than one backup LSPs having same set of destination nodes, sharing same next-hop nodes and the same outgoing interfaces, the path establishing request messages for the more than one backup LSPs, and selecting a path establishing request message to be saved after the merging according to a certain policy.

6. The method of claim 5, wherein the selecting the path establishing request message to be saved after the merging according to the certain policy further comprises:
   saving path establishing request messages for backup LSPs that do not pass a node protected by any of the other backup LSPs.

7. The method of claim 6, wherein when the number of the backup LSPs that do not pass a node protected by any of the other backup LSPs is greater than one, the selecting the path establishing request message to be saved after the merging according to the certain policy further comprises:
   selecting backup LSPs closest to the primary LSP from the backup LSPs that do not pass a node protected by any of the other backup LSPs, and saving path establishing request messages for the selected backup LSPs, wherein the backup LSPs closest to the primary LSP have smallest weight of distance from the node as a detour merge point to the primary LSP.

8. The method of claim 7, wherein when the number of the backup LSPs closest to the primary LSP is greater than one, the selecting the path establishing request message to be saved after the merging according to the certain policy further comprises:
   selecting one backup LSP from the backup LSPs closest to the primary LSP according to a local policy of the detour merge point, and saving the path establishing request message for the selected backup LSP.

9. A node for implementing multicast fast reroute, comprising a transceiver unit and a backup LSP path establishing unit, wherein:
   the transceiver unit is adapted to send to the backup LSP path establishing unit received routing information of a primary LSP and information of a protection object to be protected by a backup LSP;
   the backup LSP path establishing unit is adapted to determine a route for the backup LSP according to the received routing information of the primary LSP and the information of the protection object to be protected by the backup LSP, and establish the backup LSP according to the determined route for the backup LSP; and
   wherein the backup LSP path establishing unit is further adapted to determine a set of destination nodes of downstream nodes of the node in the primary LSP according to the received routing information of the primary LSP, determine the protection object to be protected by the backup LSP according to the information of the protection object, and determine the route for the backup LSP according to the set of destination nodes and the protection object, wherein the node is a source node of the route for the backup LSP, the destination nodes of the route for the backup LSP are the set of destination nodes, and the route for the backup LSP bypasses the protection object.

10. The node of claim 9, wherein the backup LSP path establishing unit is further adapted to merge a path establishing request message for the primary LSP and path establishing request message for backup LSPs corresponding to the primary LSP after receiving the path establishing request messages, and send the merged path establishing request message through the transceiver unit.

* * * * *